Nov. 26, 1963 T. M. JENNEY ETAL 3,112,278
METHOD OF REGENERATING A NOBLE METAL HYDROGENATION CATALYST
Filed March 14, 1961 3 Sheets-Sheet 1

Inventors:
THEODORE M. JENNEY,
DONALD H. PORTER &
BY EUGENE M. ZDROJEWSKI
ATTORNEYS Nov. 26, 1963  T. M. JENNEY ETAL  3,112,278
METHOD OF REGENERATING A NOBLE METAL HYDROGENATION CATALYST
Filed March 14, 1961  3 Sheets-Sheet 2

Inventors:
THEODORE M. JENNEY,
DONALD H. PORTER &
BY EUGENE M. ZDROJEWSKI
ATTORNEYS

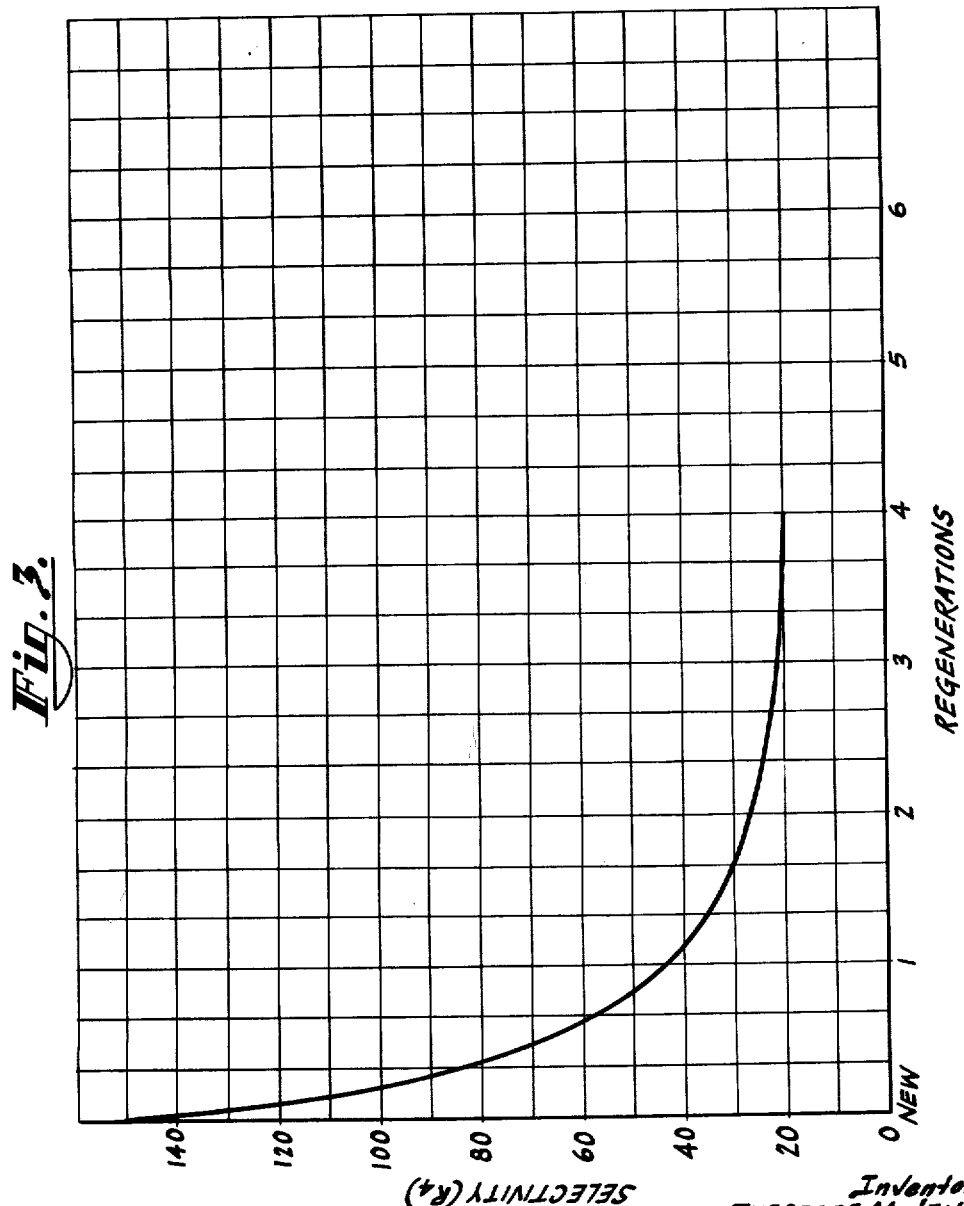

United States Patent Office 3,112,278
Patented Nov. 26, 1963

3,112,278
METHOD OF REGENERATING A NOBLE METAL HYDROGENATION CATALYST
Theodore M. Jenney, Arlington, Mass., and Donald H. Porter and Eugene M. Zdrojewski, Tonawanda, N.Y., assignors to FMC Corporation, a corporation of Delaware
Filed Mar. 14, 1961, Ser. No. 95,694
4 Claims. (Cl. 252—420)

This invention relates to the production of hydrogen peroxide by the catalytic reduction and subsequent oxidation of an anthraquinone working material, and more particularly to the regeneration of the catalyst used in the reduction step.

Heretofore, the anthraquinone process has been carried out by dissolving an alkylated anthraquinone, e.g. 2-ethyl anthraquinone or mixtures of various alkylated anthraquinones, in selected solvents and alternately reducing and oxidizing the mixture or working solution. Hydrogen peroxide is produced during the oxidation step and is separated from the remainder of the working solution. This process is fully described in United States Patent 2,657,980, issued to Sprauer on November 3, 1953.

A catalytic reduction is required in this process in order to add hydrogen to the anthraquinone working compound at a rate sufficient for commercial operation. The catalyst is selected to selectively hydrogenate the quinone form of the working compound to the hydroquinone form, without unduly attacking the compound to produce degradation products, which are incapable of producing hydrogen peroxide. All known catalysts produce some degradation, and maximum selectivity is a desired property.

One drawback to the catalytic hydrogenation is that the catalyst loses its activity in a relatively short time and either must be replaced with fresh catalyst or alternately must be treated to restore its activity. Prior workers have employed a variety of methods for regenerating the catalyst. In United States Patent 2,692,240, issued to Sprauer on October 19, 1954, the catalyst is regenerated with an oxidizing agent, while in British Patent 788,340, issued to La Porte, the catalyst is regenerated using alkali. Some of the drawbacks of these prior regeneration methods are that they are relatively expensive, in most cases require special equipment to carry out the regeneration treatment, and can cause spalling of the metallic catalyst from its support.

It is an object of the present invention to regenerate a hydrogenation catalyst in a manner which not only improves the activity of the catalyst but, surprisingly, also improves the selectivity thereof.

It is a further object of the invention to carry out the regeneration of a hydrogenation catalyst contained in a fixed bed without removing said catalyst from the hydrogenating chamber.

It is a further object to carry out the regeneration of hydrogenation catalyst under conditions which materially increase the life of the catalyst and which cause little or no spalling of the metal catalyst from the inert support therefor.

It has now been determined unexpectedly that the noble metal catalysts supported on inert carriers can be regenerated to both restore their activity and increase their selectivity by treating the catalysts with wet steam at temperatures between 80° and 200° C. for periods as low as 4 hours. The steam should contain at least about 10% water, and about 2.0 kilograms of this wet steam are required to regenerate a liter of catalyst. The use of wet steam is necessary if all the improvements in selectivity and activity are to be realized. Regeneration with dry steam does not produce the novel results described.

The present process can be effectively employed in "fixed bed" types of catalyst chambers. In this type of operation, the catalyst is suspended in a fixed bed within the catalytic chamber and rests on a perforate support. The working solution to be hydrogenated is passed through the bed along with hydrogen, and reduction takes place as the working solution and hydrogen contact the catalyst bed. While other catalyst systems, i.e. fluid beds containing suspended catalyst, can also be regenerated by the present process, it has been found that this process is particularly suitable for "fixed bed" operations because regeneration of the catalyst can be carried out in place without removing the catalyst from the bed.

Regeneration of the catalyst takes place by passing wet steam through the catalytic bed. While the mechanism and reason for the regeneration are not fully known, it is believed that the steam acts as a stripping medium and separates any catalytic-hindering impurities from the surface of the noble metal catalyst. The water carried by the steam appears to act as a washing medium, in conjunction with the steam, and carries away all catalytic-hindering impurities separated by the steam.

The steam should contain at least about 10% water. This amount of water is required to wash away effectively the catalytic-hindering impurities from the surface of the catalyst. Steam containing larger amounts of water also can be successively employed. The steam is effective at temperatures as low as about 80° C. when subatmospheric pressures are employed, and as high as about 200° C. when superatmospheric pressures are desired. A preferred range of about 90° to about 120° C. is generally employed in carrying out the regeneration. The wet steam should contact the catalyst for a period of at least about 4 hours. Longer durations of contact may be employed, if desired, to obtain higher activities.

The catalysts which may be treated by the present process are generally the noble catalysts such as palladium, rhodium, and platinum. These noble metals may be carried on inert carriers such as carbonates, alumina, carbon, alkaline earths, silica gel, etc. The preferred noble metals which have been found suitable for regeneration by the present process, and which are extensively used in the anthraquinone process, are palladium and platinum.

It has been found that each liter of catalyst requires the use of about 2.0 kilograms of wet steam in order to effectively increase the activity of the catalyst. This amount of wet steam not only regenerates the spent catalyst to a high level of activity but also increases the selectivity of the hydrogenation catalyst; that is, the present treatment increases the ability of the catalyst to hydrogenate the working compound to its hydroquinone form, without increasing the degree of conversion of anthraquinone working compound to degradation products. This increase in selectivity is extremely important since it permits a catalyst to increase the yield of peroxide obtained without proportionately increasing the amount of degradation products obtained during the catalytic hydrogenation. It should be noted that this desirable selectivity increases with each succeeding regeneration until the useful life of the catalyst has been reached.

This is more clearly illustrated in the following examples and drawings, in which:

FIGURE 3 is a graphic illustration of the selectivity of

Example 1

Figure 1:
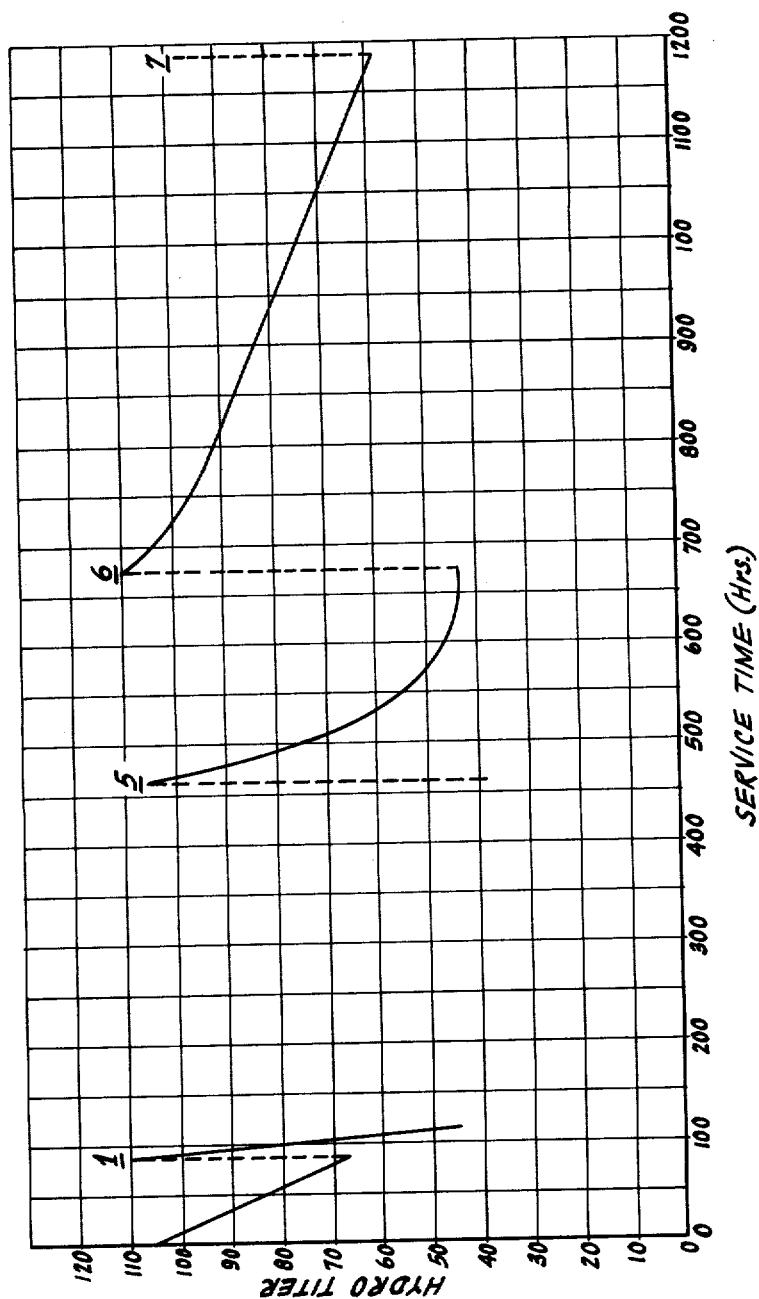
FIGURE 1 is a graphic illustration of the activity level of the catalyst, before and after regeneration, as carried out in Example 1. In this drawing, 1, 5, 6 and 7 refer to the interval when the first, fifth, sixth, and seventh regeneration took place respectively.

A fixed bed hydrogenator was charged with 3 liters of a catalyst comprising 0.3% palladium on a dolomite carrier, and having a particle size of 10–20 mesh. The solvent used in the working solution comprised 61 wt. percent dimethylnaphthalene as the quinone solvent and 39 wt. percent trioctylphosphate as the hydroquinone solvent, and contained between 8 and 9 wt. percent of 2-ethyl anthraquinone as the working compound.

The working solution, which is composed of the working compound dissolved in the working solvents, was passed downwardly through the fixed bed, along with excess hydrogen to give an 80% depth of hydrogenation at 40° C. Of the total flow passed through the hydrogenator, a fraction was recycled directly to the top of the catalytic chamber. The remainder was passed on as "forward flow" to the oxidizing tower, where oxidation of the working compound with air was carried out. The rates of recycle and forward flow were 100 liters/hour and 10 liters/hour respectively. The oxidized working solution was extracted with water, and hydrogen peroxide was recovered at the rates given in FIGURE 1.

The operation of this process was continued until the activity had dropped to a hydro-titer which was below an acceptable value (about 50). The hydro-titer is defined as the number of cubic centimeters of 0.5 Normal potassium permanganate solution required to react with the hydrogen peroxide extracted from 100 cc. of oxidized working solution. Thus a titer of 100 would indicate that 0.85 gram (0.025 gram mole) of hydrogen peroxide can be recovered from every 100 cc. of working solution passed through the oxidizer. At this point continuous flow through the hydrogenator was interrupted, and the catalytic bed was subject to regeneration using wet steam. The steam, which contained 15% water and which was at a temperature of 98° C., was allowed to impinge against the catalytic bed for a period of 16 hours. Following this treatment, the flow of working solution through the hydrogenator was again resumed, and the activity of the catalyst was determined in terms of its hydro-titer.

The above procedure was repeated each time a regeneration was performed. A total of seven such regenerations was performed. The hydro-titers of the catalyst prior and subsequent to the regeneration are shown in FIGURE 1, relative to the operating periods the anthraquinone process was on stream. FIGURE 1 shows the hydro-titers obtained when the catalyst was new, after the first regeneration, and after the fifth, sixth, and seventh regenerations. The exact hydro-titers obtained after the second, third and fourth regeneration were not determined exactly because they were all found to be of the same order as those obtained in the first regeneration.

Example 2

A fixed bed hydrogenator was charged with 160 liters of a catalyst comprising 0.3% palladium on an activated alumina carrier, and having a particle size of 8–14 mesh. The solvent used in the working solution comprised 61 wt. percent dimethylnaphthalene as the quinone solvent and 39 wt. percent trioctylphosphate as the hydroquinone solvent, and contained between 8 and 9 wt. percent of 2-ethyl anthraquinone as the working compound.

The working solution, which is composed of the working compound dissolved in the working solvents, was passed downwardly through the fixed bed, along with excess hydrogen to give a 60% depth of hydrogenation at 40° C. Of the total flow passed through the hydrogenator, a fraction was recycled directly to the top of the catalytic chamber. The remainder was passed on as "forward flow" to the oxidizing tower, where oxidation of the working compound with air was carried out. The rates of recycle and forward flow were between 4000 to 5000 liters/hour and 400 liters/hour respectively. The oxidized working solution was extracted with water, and hydrogen peroxide was recovered at the rates given in FIGURE 2.

The operation of this process was continued until the activity had dropped to a hydro-titer which was below an acceptable value. The hydro-titer is defined as the number of cubic centimeters of 0.5 Normal potassium permanganate solution required to react with the hydrogen peroxide extracted from 100 cc. of oxidized solution. Thus a titer of 100 would indicate that 0.85 gram (0.025 gram mole) of hydrogen peroxide can be recovered from every 100 cc. of working solution passed through the oxidizer. At this point continuous flow through the hydrogenator was interrupted, and the catalytic bed was subject to regeneration using wet steam. The steam, which contained 15% water and which was at a temperature of 99° C., was allowed to impinge against the catalytic bed for a period of 16 hours. Following this treatment, the flow of working solution through the hydrogenator was again resumed, and the activity of the catalyst was determined in terms of its hydro-titer.

Figure 2:
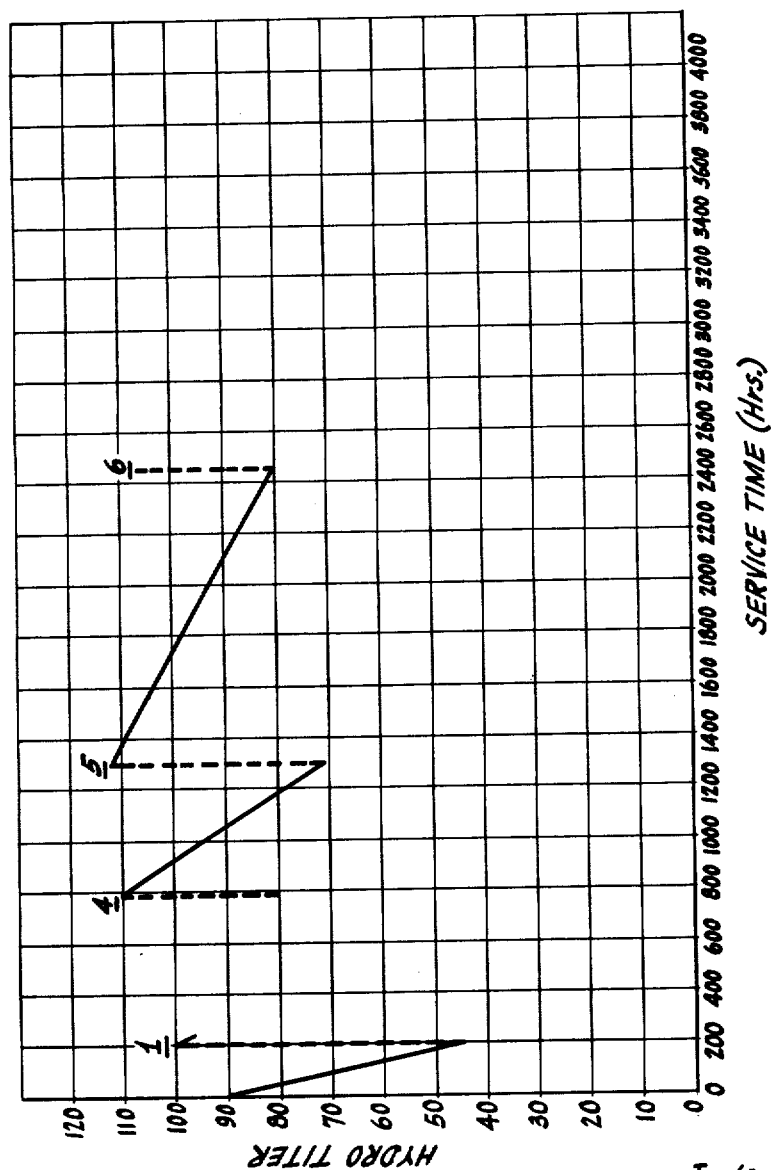
FIGURE 2 is a graphic illustration of the activity level of the catalyst, before and after regeneration, as carried out in Example 2. In this drawing 1, 4, 5, and 6 refer to the interval when the first, fourth, fifth, and sixth regeneration took place respectively.

The above procedure was repeated each time a regeneration was performed. A total of 6 such regenerations was performed. The hydro-titers of the catalyst prior and subsequent to the regeneration are shown in FIGURE 2, relative to the operating periods the anthraquinone process was on stream. FIGURE 2 shows the hydro-titers, or activities, obtained when the catalyst was new, after the first regeneration, and after the fourth, fifth, and sixth regenerations. The exact hydro-titers obtained after the second and third regenerations were not determined exactly because they were all found to be of the same order as those obtained in the first regeneration.

Example 3

A fixed bed hydrogenator was charged with 3 liters of catalyst comprising 0.3% palladium on an extruded alumina carrier and having a particle size of $\frac{1}{16}$ inch. A total of about 25 liters of working solution was used in the test. The solvent used in the working solution comprised 61 wt. percent dimethylnaphthalene as the quinone solvent and 39 wt. percent trioctylphosphate as the hydroquinone solvent, and contained between 11.6 and 14 wt. percent of 2-ethyl anthraquinone as the working compound.

The working solution which is composed of working compound dissolved in the working solvents was passed downwardly through the fixed bed along with excess hydrogen to give a 42% depth of hydrogenation at 36° C. Of the total flow passed through the hydrogenator, a fraction was recycled directly to the top of the catalytic chamber. The remainder was passed on as "forward flow" to the oxidizing tower where oxidation of the working compound with air was carried out. The rates of recycle and forward flow were 100 liters per hour and 10 liters per hour respectively. The oxidized working solution was extracted with water, and hydrogen peroxide was recovered. This procedure was conducted for 189 hours during which the solution was subjected to analysis to determine the extent to which the following reactions occurred:

(1) 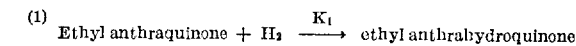
Ethyl anthraquinone + $H_2$ $\xrightarrow{K_1}$ ethyl anthrahydroquinone (2) 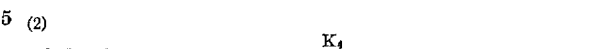
Ethyl anthrahydroquinone + $H_2$ $\xrightarrow{K_4}$ waste (degradation products)

The selectivity of the catalys, $R_4$, is defined as the ratio of the rate of formation of waste product from ethyl anthrahydroquinone to the rate of formation of the desired product, ethyl anthrahydroquinoine ($K_4/K_1$) and this value is given in FIGURE 3 for the new catalyst. The smaller this ratio ($R_4$), the more selective and efficacious is the catalyst.

After this determination was made, continuous flow through the hydrogenator was interrupted, and the catalytic bed was subjeced to regeneration using wet steam. The steam, which contained 15% water and was at a temperature of 98° C., was allowed to impinge against the catalytic bed for 16 hours. Following this treatment, the flow of working solution through the hydrogenator was again resumed and the selectivity of the catalyst was again determined. The above procedure was repeated each time a regeneration was performed. A total of 4 such regenerations was performed, and the selectivity of the catalyst after these regenerations is given in FIGURE 3.

It should be noted that when the selectivity of a catalyst is determined in a system containing other working compounds in addition to ethyl anthraquinone, which also have an efficacy for producing hydrogen peroxide, the hydrogenated products of this compound must be included in the ratio of desired products to waste. Thus, in a system employing 2-ethyl anthraquinone and 2-ethyl tetrahydroanthraquinone as the working compounds, the selectivity is measured by comparing the ratio of the rate of formation of all the waste product to the rate of formation of the desired products, namely, 2-ethyl anthrahydroquinone and 2-ethyl tetrahydroanthrahydroquinone.

A comparison of the activity levels of a new catalyst and the same regenerated catalyst clearly shows that the present process regenerates the catalyst to at least the same activity as the new catalyst and, in many cases, improves the activity level substantially over that of the catalyst when new. Additionally, many steam regenerations can be performed on the same catalyst with these beneficial effects. This is more clearly illustrated in FIGURES 1 and 2, each of which shows the effect of six regenerations. In each of the regenerations shown, the activity of the catalyst increased to a level above that of the new catalyst. As shown in FIGURE 1, up to seven regenerations have been carried out before any loss in activity has been noted in the regenerated catalyst as compared with the new catalyst.

Similarly, a comparison of the selectivity of the catalyst when new, and after each regeneration, shows the marked improvement in selectivity, particularly after the very first regeneration. This is shown in FIGURE 3 wherein the selectivity ($R_4$) of the catalyst changed from 1.50% when new, to 0.40% after the first regeneration. As stated above the lower the value for $R_4$, the more selective is the catalyst.

An additional benefit of the present regeneration process is the increased duration of catalytic life with succeeding regenerations. That is, the regenerated catalyst becomes capable of increasingly longer use after each succeeding regeneration, before falling to an activity level low enough to require another regeneration. This is graphically shown by FIGURE 1, wherein the period of successful catalyst operation of the new catalyst was only about 85 hours. After the fifth regeneration the successful operating period was increased to about 215 hours. After the sixth regeneration the period of operation was further increased to about 510 hours. This feature is further shown in FIGURE 2, wherein the new catalyst successfully operated for only 200 hours. After the fourth regeneration this operating period was increased to at least about 510 hours, and further increased after the fifth regeneration to at least about 1150 hours.

As a result, the present regenerating system desirably increases the total life of the catalyst far beyond the mere cumulative addition of equal operating periods for each succeeding regeneration. Such a result is completely unexpected but extremely advantageous in industrial applications.

Another benefit of the present process is that working solution which is absorbed or entrained within the "fixed bed" can be recovered. The wet steam which is passed through the catalytic bed not only regenerates the catalyst but also drives off all the working solution remaining in the bed. This organic solution can be recovered and readily separated from any water present in the steam because of its low solubility in water. The amount of recovered working solution becomes quite sizeable when a large number of regenerations have been carried out.

Pursuant to the requirements of the patent statutes, the principle of this invention has been explained and exemplified in a manner so that it can be readily practiced by those skilled in the art, such exemplification including what is considered to represent that best embodiment of the invention. However, it should be clearly understood that, within the scope of the appended claims, the invention may be practiced by those skilled in the art, and having the benefit of this disclosure, otherwise than as specifically described and exemplified herein.

What is claimed is:
1. The method of regenerating a spent noble metal hydrogenation catalyst used in the process of producing hydrogen peroxide, in which said catalyst is employed during the hydrogenation of an anthraquinone working compound, which comprises contacting said spent catalyst with wet steam containing at least about 10% water at temperatures from about 80° to 200° C. for a period of at least about 4 hours whereby said catalyst increases in both its activity and selectivity.
2. The method of claim 1 in which the temperature of the steam is maintained from about 90 to 120° F.
3. The method of claim 1 in which said catalyst is contained in a fixed bed and is regenerated in place.
4. The method of claim 1 wherein said catalyst is palladium.

References Cited in the file of this patent
UNITED STATES PATENTS

| | | |
|---|---|---|
| 2,692,240 | Sprauer | Oct. 19, 1954 |
| 2,925,391 | Lait et al. | Feb. 16, 1960 |

UNITED STATES PATENT OFFICE
CERTIFICATE OF CORRECTION

Patent No. 3,112,278                  November 26, 1963

Theodore M. Jenney et al.

It is hereby certified that error appears in the above numbered patent requiring correction and that the said Letters Patent should read as corrected below.

Column 2, line 26, for "successively" read -- successfully --; column 4, line 67, for "catalys" read -- catalyst --; column 5, line 2, for "subjeced" read -- subjected --; column 6, line 47, for "120° F." read -- 120° C. --.

Signed and sealed this 19th day of May 1964.

(SEAL)
Attest:

ERNEST W. SWIDER
Attesting Officer

EDWARD J. BRENNER
Commissioner of Patents